United States Patent [19]

Maier

[11] Patent Number: 4,939,828

[45] Date of Patent: Jul. 10, 1990

[54] METHOD OF PRODUCING STIFFENING PROFILES, PARTICULARLY OF REDUCED WEIGHT

[76] Inventor: Peter Maier, Gottlieb-Daimler-Strasse, 7700 Singen, Fed. Rep. of Germany

[21] Appl. No.: 364,235

[22] Filed: Jun. 12, 1989

[30] Foreign Application Priority Data

Jun. 24, 1988 [DE] Fed. Rep. of Germany ....... 3821275

[51] Int. Cl.⁵ ............................................. B23P 17/00
[52] U.S. Cl. .................................... 29/897.2; 72/254; 29/897.312
[58] Field of Search ..................... 72/253.1, 254, 256; 29/150, 155; 403/331; 296/50, 61

[56] References Cited

U.S. PATENT DOCUMENTS

| | | | |
|---|---|---|---|
| 2,727,781 | 12/1955 | D'Eath | 296/61 |
| 2,767,016 | 10/1956 | Wood | 296/61 |
| 2,798,284 | 7/1957 | Mudd | 29/155 R |
| 3,388,579 | 6/1968 | Hilton | 72/256 |
| 4,266,381 | 5/1981 | Deller | 72/253 R |
| 4,428,218 | 1/1984 | LaRocca | 72/256 |
| 4,463,057 | 7/1984 | Knurr | 72/253.1 |

Primary Examiner—Lowell A. Larson
Attorney, Agent, or Firm—Bachman & LaPointe

[57] ABSTRACT

In a method of producing stiffening profiles, particularly of reduced weight, for example for robot arms, transmission parts, bicycle frames, loading tailgates, crossing tailgates or the like, the stiffening profile is extruded in its contours and configurations at right angles to its plane and the stiffening profiles are then cut off in a required thickness.

4 Claims, 6 Drawing Sheets

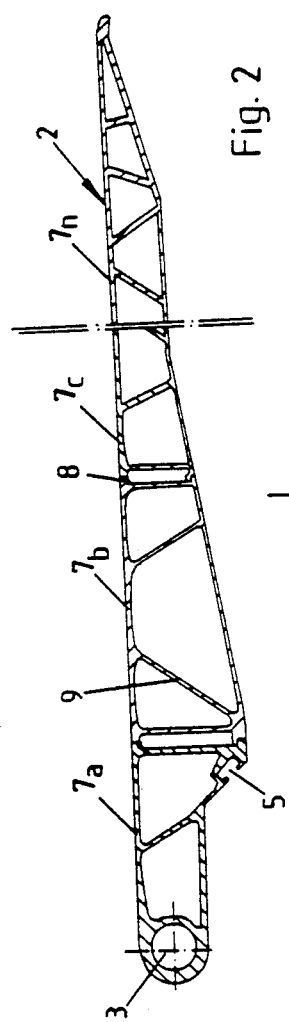
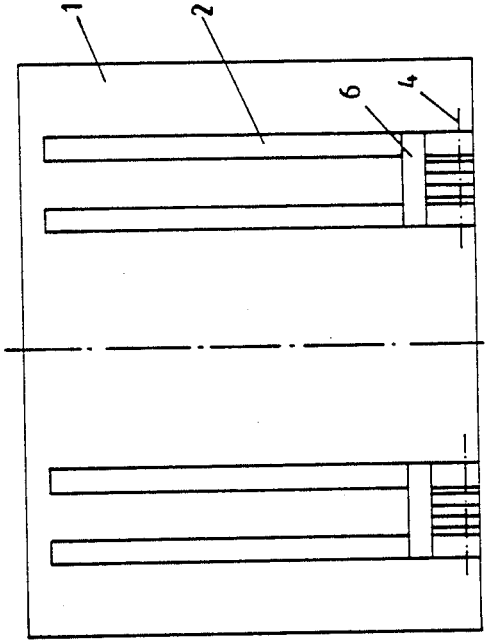

METHOD OF PRODUCING STIFFENING PROFILES, PARTICULARLY OF REDUCED WEIGHT

BACKGROUND OF THE INVENTION

The invention relates to a method of producing stiffening profiles, particularly of reduced weight, for example for robot arms, transmission parts, bicycle frames, loading tailgates, crossing tailgates or the like.

Stiffening profiles of this type generally consist of hollow profiles which have corresponding stiffening ribs passing through them. Their production can be effected for example by stamping, precision cutting, pressing or extrusion. These modes of production, and also the costs of the raw material from which the stiffening profiles are formed, represent a problem nowadays.

The stiffening profiles are required to satisfy the highest standards as regards their physical characteristics on the one hand, but on the other hand to be as light as possible and to use as little raw material as possible.

For example, the production of robot arms can be performed by precision cutting or stamping for a very favorable cost. But on the other hand, the waste produced by precision cutting and stamping is also very high. In the case of loading tailgates, which generally consist nowadays of extruded aluminum profiles assembled in the longitudinal direction, the use of material is particularly high, which should not be necessary at all for the required physical characteristics.

The inventor adopted the object to develop a method of the above-stated type by which required stiffening profiles of whatsoever type can be produced at favorable cost without prejudice to their physical characteristics. It is also an object of the invention to disclose a device, particularly a loading tailgate or crossing tailgate, in which such stiffening profiles are used.

SUMMARY OF THE INVENTION

The foregoing object is achieved by a method of the abovestated type whereby the stiffening profile is extruded in its contours and configurations at right angles to its plane and the stiffening profiles are then cut off in a required thickness.

It is possible by this method to cut off the corresponding stiffening profiles from an extruded profile which can be produced at favorable cost, in a simple manner. It is thus possible to minimize waste. It is thus possible, for example, to produce robot arms which exhibit adequate mechanical strength by corresponding stiffening webs, but use a considerably smaller quantity of material.

The invention is not to be specific to a given stiffening profile, but its field of application is so versatile that to circumscribe it would exceed the scope of this patent application.

If a corresponding stiffening profile should be required to exhibit a length which exceeds a multiple of an individual profile, then it is possible to place the required number of extruded profiles, possibly in different constructions, together in their longitudinal direction, to join, particularly weld, them together, and only then to cut off the stiffening profiles in their required thickness. All possible forms of stiffening profiles can be produced in this manner, they may also be multiple-armed inter alia.

Extrudable metal is particularly used as a material for the stiffening profiles, and here again particularly aluminum.

The invention will be discussed further with reference to a preferred device which consists of a stiffened platform, particularly a loading tailgate or crossing tailgate. Longitudinal rails which consist of cut-off extruded profiles are placed under a corresponding platform plate in this case. In contrast to the conventional loading tailgates, a quite considerable economy of material is made here, without making it impossible for the physical desiderata of this loading tailgate to be fulfilled. The waste is also essentially minimized.

In the case of the loading tailgate hitherto known, which consisted of assembled hollow profiles, it was necessary for corresponding connecting parts for the hydraulic drive for raising and lowering the loading tailgate to be placed on the latter. The application of force is relatively unfavorable in this case and has a very negative influence on the weld seams of the attachment.

In the case of the present invention of a loading tailgate with individual longitudinal rails, the drive can engage between two longitudinal rails, and surfaces formed somewhat at right angles to the transmission of force be constructed in the longitudinal rails. The force is then transmitted to these surfaces, so that stressing of weld seams no longer occurs.

The joining between platform plate and longitudinal rails may be effected by welding, riveting or the like. In a preferred exemplary embodiment of the invention it is intended to form on the platform plate profile strips by which it engages in housing grooves of the longitudinal rails.

Said profile strips may be of T-shaped construction, for example, in which case the longitudinal rails have corresponding T-shaped housing grooves. Said profile strips on the underside of the platform plate also act simultaneously as transverse stiffening means.

In the other case it will be found favorable to provide still further transverse rails on the underside of the platform plate. Said transverse rails may also, precisely as the longitudinal rails, consist of corresponding extruded profile sections. In the position of use they engage into corresponding chamber sections or chambers of the longitudinal rails, pass through the latter and are optionally joined to the longitudinal rails.

This form of construction of the invention can yield a material economy of up to 50%.

It is a further advantage of the invention, particularly with reference to the loading tailgate, that such a loading tailgate can be folded. This advantage is particularly evident where the rear wall of a carrier vehicle is relatively low, so that the loading tailgate will be relatively steep in the lowered position of use. This problem is eliminated by a foldable loading tailgate.

In order to create this foldability of the loading tailgate, the latter consists of different parts which are joined articulately to each other. In a simple case there may be a pivot, in which case the corresponding longitudinal rail parts are arranged staggered to each other so that they are juxtaposed in the folded state.

The thickness of the folded parcel is reduced by this means.

On the other hand, if the individual parts of the loading tailgate are required to be superposed by their platform part, then it will probably be found favorable if corresponding articulated strips which ensure said superposition are provided. However, this is not to limit the invention.

BRIEF DESCRIPTION OF THE DRAWINGS

Further advantages, features and particulars of the invention will emerge from the description given below of preferred exemplary embodiments and with reference to the drawing in which FIG. 1 shows a bottom view of a loading tailgate according to the invention;

FIG. 2 shows a longitudinal section of a longitudinal rail, partly shown;

DETAILED DESCRIPTION OF THE INVENTION

Figure 3:
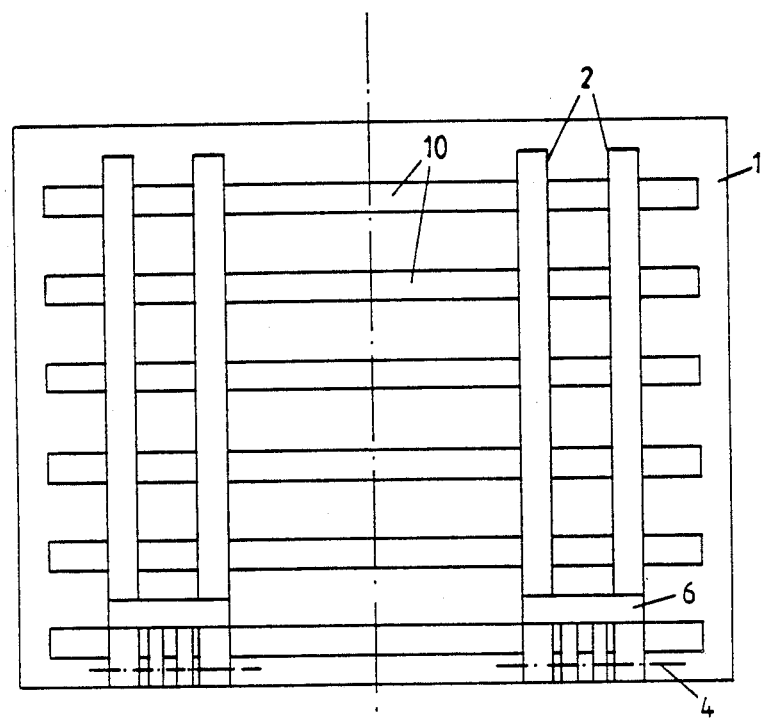
FIG. 3 shows a bottom view of a further exemplary embodiment of a loading tailgate.

In FIG. 1, a loading tailgate exhibits a platform plate 1, under which four longitudinal rails 2 are placed in the present construction. In order to produce said longitudinal rails 2, according to the invention a number of extruded profiles are first of all assembled to form a platform and welded together, and the longitudinal rails are then cut off as slices. Aluminum extruded profiles in particular are used, as shown in FIG. 2.

Each longitudinal rail 2 exhibits on the one hand an eye 3 for articulate connection to a carrier vehicle, not shown in detail, corresponding bolts or axles forming a pivot axis 4, which is only indicated by chain-dotted lines in FIG. 1. Each longitudinal rail 2 also has housing grooves 5 for the engagement of a hoisting device, likewise not shown in detail, which is joined to the longitudinal rails 2 by corresponding bracing strips 6.

Each longitudinal rail 2 consists of different extruded profiles 7a,7b,7c and 7n joined to each other, the joining being effected by corresponding tongue and groove joints 8 and by a weld seam.

Stiffening ribs 9 pass through the interior of the extruded profiles 7.

The joining of longitudinal rails 2 to the platform plate 1 may be effected by welding, for example. A corresponding nipple plate is available for the choice of the platform plate 1.

In a further construction of the invention according to FIG. 3 the longitudinal rails 2 are further joined to each other by additional transverse rails 10. This substantially improves the rigidity of the entire loading tailgate.

Figure 4:
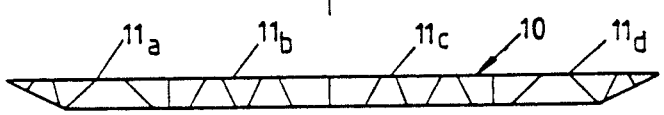
FIG. 4 shows a plan view of a transverse rail.
Figure 5:
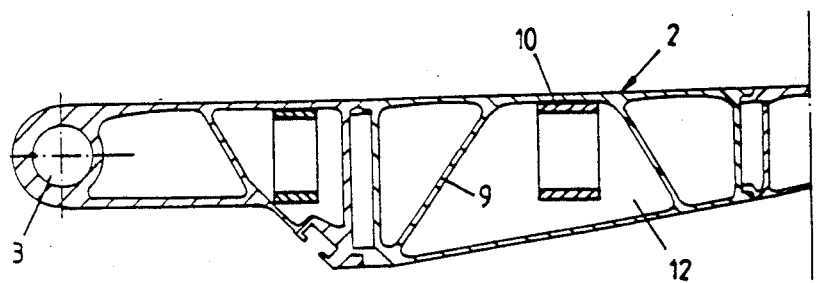
FIG. 5 shows a partial longitudinal section through a longitudinal rail with a transverse rail inserted and shown in section.

FIG. 4 shows an example of such a transverse rail 10 which, similarly to the longitudinal rails 2, consists of assembled extruded profile sections 11a,11b,11c and 11d. Said extruded profile sections 11 can then be inserted into chamber sections 12 of the longitudinal rails 2, which are formed by the stiffening ribs 9, as shown in FIG. 5. The joining between transverse rail 10 and longitudinal rail 2 is preferably likewise effected by welding.

Figure 6:
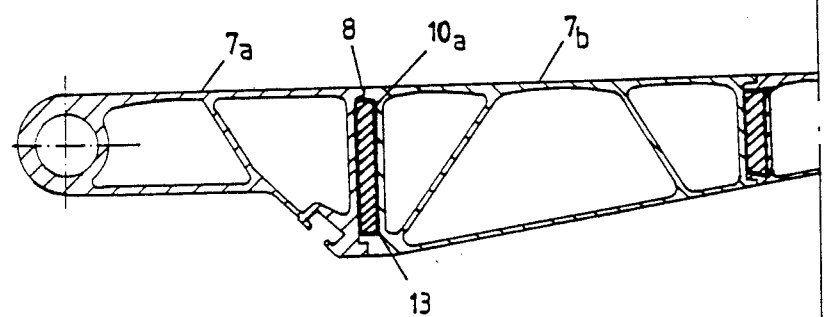
FIG. 6 shows the section according to FIG. 5 with a further exemplary embodiment of an inserted transverse rail.

Another exemplary embodiment of a transverse rail 10a is shown in FIG. 6. Here said transverse rail 10a consists of a solid profile strip which is inserted into a chamber 13 of the longitudinal rail 2. Said chamber 13 is constructed in the region of the tongue and groove joint 8 between two corresponding extruded profiles 7.

The advantage of this insertion is that the chamber 13 is of relatively narrow configuration, so that the corresponding solid profile strip also has lateral contact.

Figure 7:
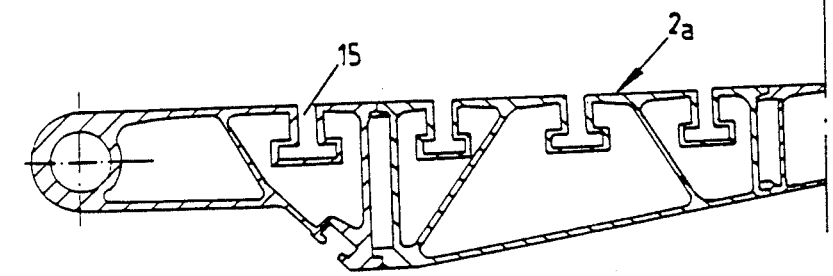
FIG. 7 shows a partial longitudinal section through a further exemplary embodiment of a longitudinal rail.
Figure 8:
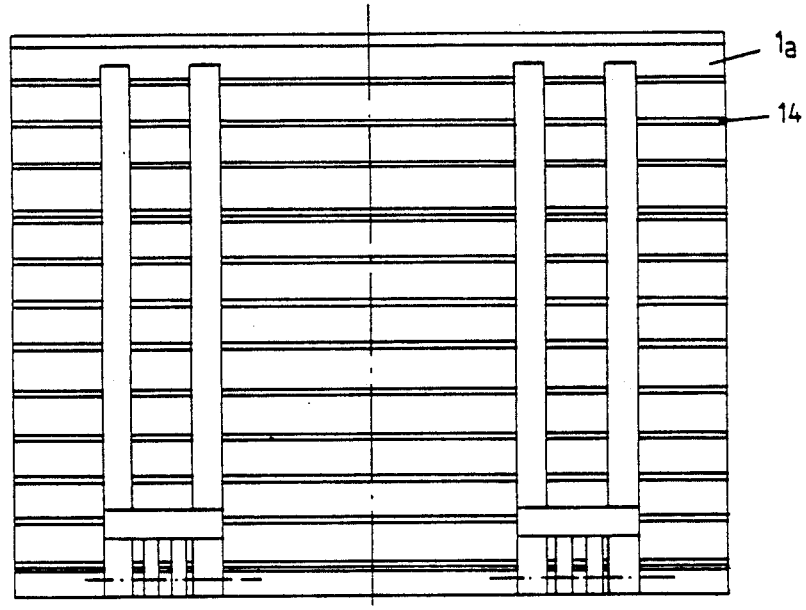
FIG. 8 shows a bottom view of a further exemplary embodiment of a loading tailgate, using longitudinal rails corresponding to FIG. 7.

A novel feature is also provided for the joining between longitudinal rails 2a and platform plate 1a according to FIGS. 7 and 8. The platform plate 1a consists here of likewise extruded floor plank profiles, on which T-shaped profile strips 14 are formed on the underside. In the position of use said T-shaped profile strips 14 engage into corresponding housing grooves 15 of the longitudinal rails 2a. Separate transverse rails are superfluous in this construction.

Figure 9:
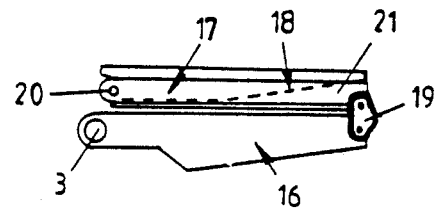
FIG. 9 shows a diagrammatic view of a folded loading tailgate.

The construction of the loading tailgate from platform plate 1 and longitudinal rails 2 or separately arranged transverse rails 10 according to the invention creates the possibility of the foldability of the loading tailgate. According to FIGS. 9 and 10 such a loading tailgate consists of three parts 16,17 and 18. The part 16 is constructed as a connecting part with the eye 3 for connection to a corresponding carrier vehicle. It also has an articulated strip 19 by which it is joined articulately to the central part 17. The articulated strip 19 is conformed so that the central part 17 can engage over the connecting part 16 with a sufficient interval when the loading tailgate is folded.

A simple pivot 20 is then sufficient for the connection of central part 17 to final part 18. Dash lines here indicate how the longitudinal rail part of the final part 18 comes into position beside the longitudinal rail part 21 of the central part 17.

Figure 10:
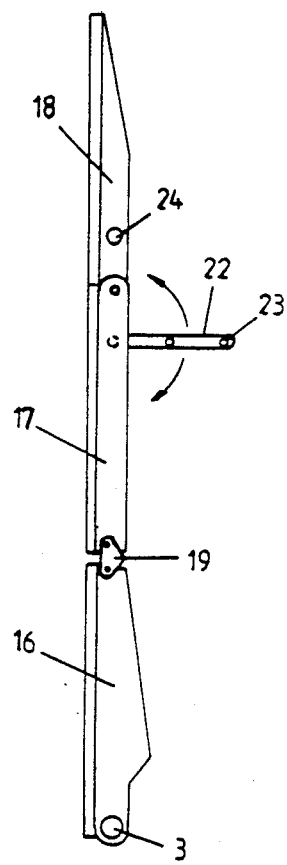
FIG. 10 shows the loading tailgate according to FIG. 9 in the unfolded position of use.

Whereas in the unfolded state according to FIG. 10 the articulated strip 19 is constructed so that the central part 17 is braced against the connecting part 16, the central part 17 should be connected to the final part 18 by a corresponding locking strap 22. A corresponding bolt 23 is inserted into an orifice 24 here in the position of use.

Figure 11:
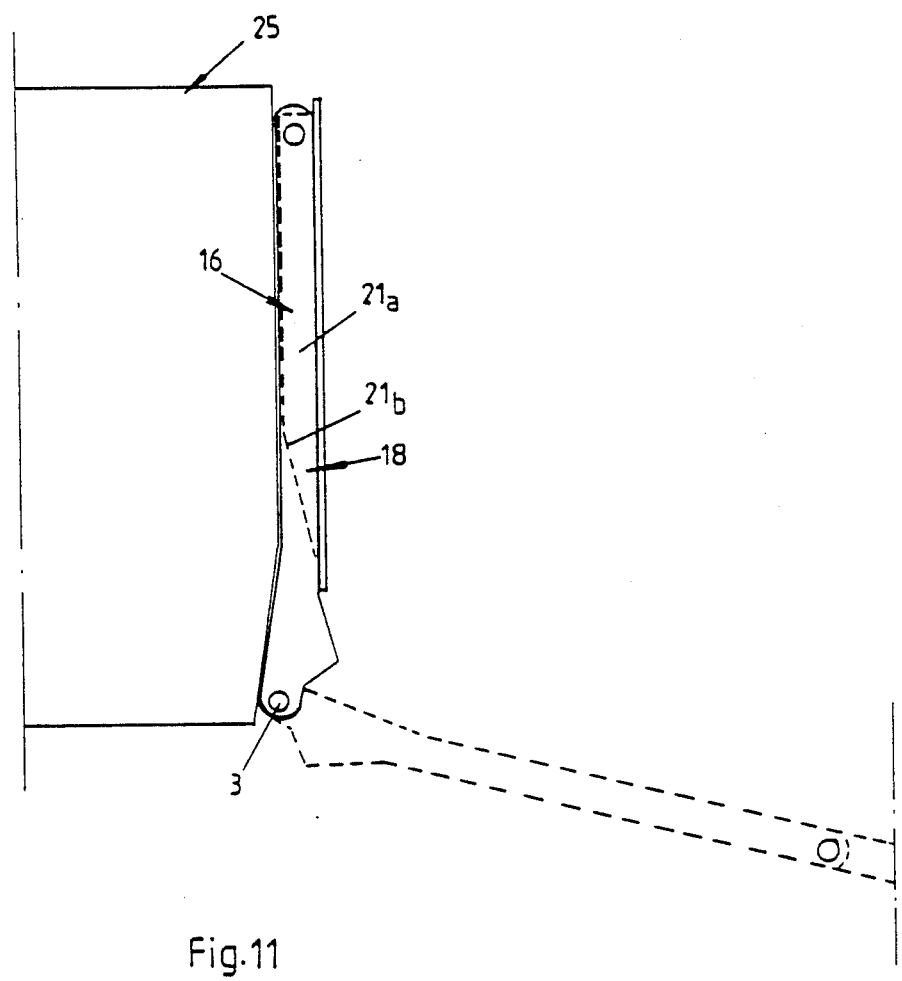
FIG. 11 shows a further exemplary embodiment of a foldable loading tailgate in position of connection to a box-type van.

A further exemplary embodiment of a foldable loading tailgate is shown in FIG. 11. This again is joined by the corresponding eye 3 to the rear side of a box-type van 25. The connecting part 16 covers the entire rear side of the box-type van 25, whereas the final part 18 is folded in. Here again it will be seen clearly that the corresponding longitudinal rail parts 21a and—indicated by dash lines—21b are arranged staggered to each other.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

we claim:

1. A method of producing extruded profiles comprising the steps of: extruding a plurality of elongated profile sections along an extrusion direction, joining at least one elongated edge of one of said plurality of elongated profile sections which lies substantially parallel to the extrusion direction to an elongated edge of another of said plurality of elongated sections which lies substantially parallel to the extrusion direction, and cutting through the joined elongated profile sections at a desired thickness along a plane substantially perpendicular to the extrusion direction of said extruded profile sections.

2. A method according to claim 1 wherein said plurality of elongated profile sections are made of aluminum.

3. A method according to claim 1 wherein the joined elongated edges of said plurality of elongated profile sections are joined by welding.

4. An extruded profile prepared in accordance with the method of claim 1.

* * * * *